United States Patent [19]

Sekida

[11] 4,021,829
[45] May 3, 1977

[54] CAMERA ATTACHMENT OPERATING DEVICE FOR SETTING EXPOSURE FACTOR

[75] Inventor: Minoru Sekida, Sakai, Japan

[73] Assignee: Minolta Camera Kabushiki Kaisha, Japan

[22] Filed: Dec. 5, 1975

[21] Appl. No.: 638,271

[30] Foreign Application Priority Data

Dec. 23, 1974 Japan .............................. 49-2530

[52] U.S. Cl. ............................... 354/219; 354/289
[51] Int. Cl.² ....................................... G03B 13/02
[58] Field of Search .......... 354/152, 202, 219, 289, 354/295, 56, 224

[56] References Cited

UNITED STATES PATENTS

| | | | |
|---|---|---|---|
| 3,742,824 | 7/1973 | Ueda et al. | 354/289 |
| 3,940,779 | 2/1976 | Kuromoto et al. | 354/56 X |

*Primary Examiner*—John Gonzales
*Attorney, Agent, or Firm*—Watson, Cole, Grindle & Watson

[57] ABSTRACT

An operating device having an operating knob for the setting of an exposure factor such as shutter speed is provided on a camera attachment which is removably connected to a camera body, the device being coupled with the exposure factor setting or adjusting mechanism of the camera body. The knob can be locked at one or more predetermined positions thereof by a locking mechanism which is rendered operative when the device has been coupled with the camera body setting or adjusting mechanism.

10 Claims, 6 Drawing Figures

CAMERA ATTACHMENT OPERATING DEVICE FOR SETTING EXPOSURE FACTOR

BACKGROUND OF THE INVENTION

The present invention relates generally to an operating device having an operating knob for the setting of an exposure factor, which device is provided on a camera attachment which is removably connected to a camera body, with the knob being coupled with an exposure factor setting or adjusting mechanism in the camera body; more particularly, the present invention relates to a mechanism for locking the knob at one or more predetermined positions thereof.

Besides the known film sensitivity setting device for a view finder unit or a shutter speed setting device for a built-on type exposure meter, a typical example of the above-mentioned operating device is a shutter speed setting device located on a view finder unit having a pentagonal prism and removably connected to a single lens reflex camera. In accordance with the operation of such a shutter speed setting device, after the view finder unit has been attached to the camera body, the operating knob thereof is manually moved to a position where it is coupled with a shutter speed setting or adjusting mechanism in the camera.

As for the shutter speed setting device of this type in which the operating knob can be set to both automatic and manual exposure positions, a locking mechanism is well known which locks the operating knob at its automatic exposure position so that the knob may not be moved inadvertently to any manual exposure position to cause an unexpected exposure. However, as the locking mechanism is constructed so as to operate whenever the knob is moved to its automatic exposure position, such device suffers from the following inconveniences or drawbacks:

a. When the view finder unit is attached to the camera body with the operating knob set to its automatic exposure position, the operating knob cannot be moved to the position where the device is coupled with the setting or adjusting mechanism unless the operating knob is released from the locking mechanism by a manipulation of a release member. However, such a manipulation has been found troublesome.

b. When the operating knob is moved so that it passes through its automatic exposure position, the locking mechanism locks the operating knob as soon as the latter reaches its automatic position. Accordingly, such troublesome manipulation is likewise necessary.

c. In the (b) situation, the operator may possibly regard the locking as a signal that the coupling between the operating knob and the shutter speed setting or adjusting mechanism in the camera body is accomplished. At this time an unexpected exposure will be effected if the shutter is released.

SUMMARY OF THE INVENTION

Accordingly, it is a primary object of the present invention to provide an operating device for the setting of an exposure factor, which is provided on a camera attachment which is removably connectable to a camera body with the operating device coupled with an exposure factor setting or adjusting mechanism in the camera. The operating device of the present invention avoids the aforementioned inconveniences or drawbacks.

Another object of the present invention is to provide an operating device for the setting of an exposure factor which is provided on a camera attachment which is removably connectable to a camera with the operating device coupled with an exposure factor setting or adjusting mechanism in the camera body and in which the operating knob for setting the exposure factor can be locked at one or more predetermined positions thereof by a locking mechanism which is rendered operative when the operating knob has been coupled with the exposure factor setting mechanism.

A further object of the present invention is to provide an operating device of the above-described type in which the locking of the operating knob by the locking mechanism can be released so that the operating knob can be moved from such predetermined positions to the other positions.

The operating device according to the present invention is provided on a camera attachment which is removably connectable to a camera body, and is provided with an operating knob capable of being set to one or more predetermined positions such as automatic exposure positions and to the other positions such as manual exposure positions. The operating device is also provided with a coupling mechanism movable together with the operating knob and capable of coupling the operating knob with an exposure factor setting or adjusting mechanism arranged in the camera body. Once the coupling between the operating knob and the setting or adjusting mechanism is carried out, the setting or adjusting mechanism is operated to set or adjust an exposure factor in accordance with the position of the operating knob.

The operating device is further provided with a locking mechanism for locking the operating knob at one or more predetermined positions thereof, a holding mechanism for holding the locking mechanism in its nonoperative position, and an actuating mechanism for moving the locking mechanism to its operative position when the coupling between the operating knob and the setting or adjusting mechanism is carried out. If the coupling is not made after the camera attachment has been connected to the camera body, the actuating mechanism does not actuate, and the holding mechanism holds the locking mechanism in its non-operative position. Then the operating knob can be freely moved irrespective of the locking mechanism to the position where the coupling is accomplished. When the coupling has been carried out, the actuating mechanism actuates to move the locking mechanism to its operative position against the influence of the holding mechanism. In its operative position the locking mechanism locks the operating knob when the operating knob is moved to the one or more predetermined positions.

In accordance with such operating device, the above-described inconveniences or drawbacks will be avoided because the operating knob can be freely moved irrespective of the locking mechanism until the coupling between the operating knob and the setting or adjusting mechanism is accomplished as described above.

The operating device according to the present invention may be further provided with a release mechanism for releasing the locking of the operating knob by the locking mechanism so that the operating knob can be moved from the predetermined positions to the other positions. According to a preferred embodiment, the release mechanism includes a release member made operable when the operating knob is locked by the locking mechanism.

These and other objects and features of the present invention will become more apparent from the following description of a preferred embodiment of the invention when taken in conjunction with the accompanying drawings.

DETAILED DESCRIPTION OF A PREFERRED EMBODIMENT

Figure 1:
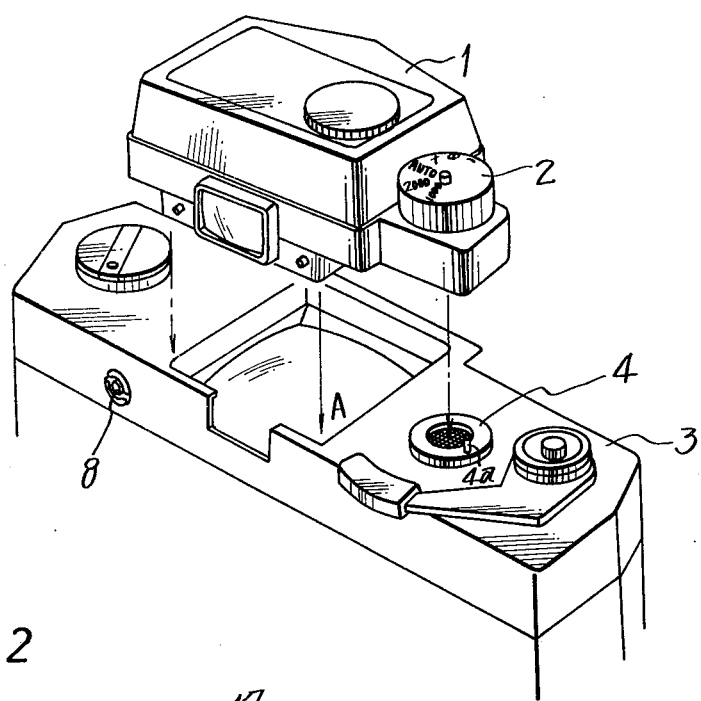
FIG. 1 is a perspective view showing an essential part of a single lens reflex camera with a view finder unit removably connected to a camera body.

In FIG. 1, an essential portion of a single lens reflex camera is shown with a view finder unit 1 having a shutter speed dial 2 in the form of an operating knob for setting the shutter speed the unit 1 being mountable on the camera body 3. An interlocking member 4 is interlocked in any normal manner with a shutter speed setting mechanism within camera body 3. An interlocking pin 4a on member 4 is engagable with a notch or a hole of a locking plate mounted for rotation with and disposed beneath shutter speed dial 2 as in a manner to be shown hereinafter. A release button 8 on the camera body is provided for releasing a locking mechanism which holds the view finder unit on the camera body. The view finder unit can therefore be removed when the release button 8 is depressed.

Figure 2:
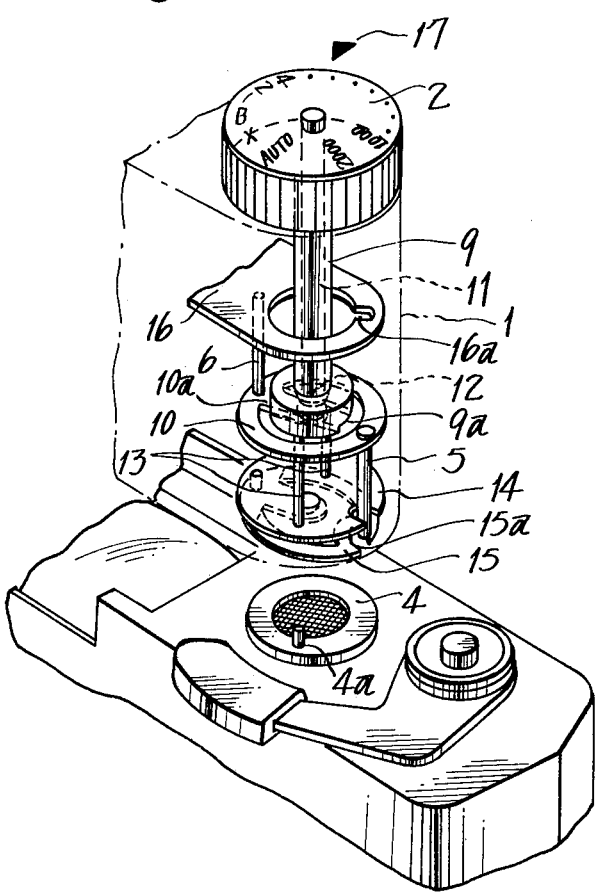
FIG. 2 is an exploded perspective view showing an operating device according to the present invention together with the single lens reflex camera shown in FIG. 1.
Figure 3:
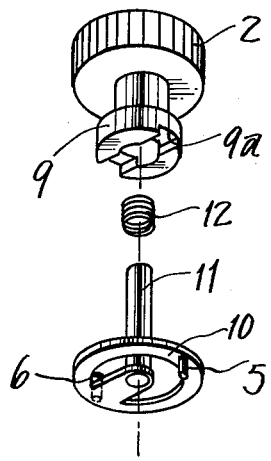
FIG. 3 is an exploded perspective view of essential members of the operating device shown in FIG. 2.
Figure 4:
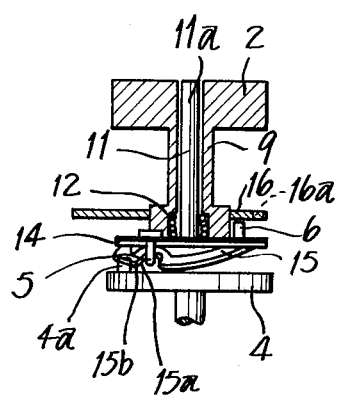
FIG. 4 is a vertical sectional view showing an operational stage of the operating device shown in FIG. 2 before coupling between a shutter dial and a shutter speed setting mechanism in the camera body.

FIGS. 2 and 3 are exploded views in perspective of an embodiment of the operating device for setting of the shutter speed acccording to the present invention. As shown therein, shutter speed dial 2 and the knob of which it is a part is integral with a hollow cylindrical shaft 9 formed with a large diameter portion having a slot 9a at its bottom surface as shown in FIG. 3. Shaft 9 is hollow throughout its extent as clearly shown in FIGS. 4 to 6 as well as through shutter speed dial 2. A sustaining ring 10 of elastic material such as spring steel is provided as having a tongue 10a extending inwardly therefrom. This tongue is engagable with slot 9a in such a manner that it can move up and down in slot 9a, and tongue 10a is urged downwardly by a coil spring 12 which is located in the large diameter portion of the hollow part in cylindrical shaft 9. Sustaining ring 10 carries an upwardly extending engaging pin 6 and a downwardly extending interlock detecting pin 5. An engagement releasing rod 11 disposed within the hollow portion of cylindrical shaft 9 is fixedly mounted at one end thereof to tongue 10a. A supporting plate 14 is fixed to cylindrical shaft 9 by means of pins 13 so that it rotates together with shaft 9. Supporting plate 14 has a notch (unreferenced) through which interlock detecting pin 5 passes. Below supporting plate 14, a coupling plate 15 of elastic material such as spring steel is so provided that it can be moved resiliently upwardly. Coupling plate 15 has a notch 15a engagable by interlock pin 4a. A fixed plate 16 secured to the housing of finder unit 1 has a notch 16a engagable by pin 6.

Figure 5:
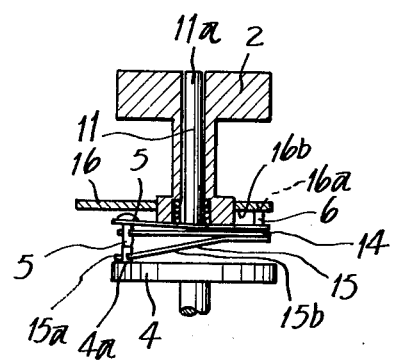
FIG. 5 is a similar view to FIG. 4 showing another operational stage of the operating device after the coupling but before locking of the shutter dial.
Figure 6:
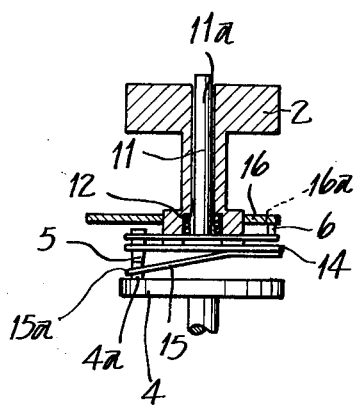
FIG. 6 is also a similar view to FIG. 4 showing still another operational stage of the operating device after the coupling and locking takes place.

In operation, when the view finder unit is moved in the direction of arrow A in FIG. 1 and is mounted on the camera body, interlock pin 4a abuts against a lower surface 15b of coupling plate 15 (FIG. 4) and deforms it against its elasticity in the event interlock pin 4a does not engage with notch 15a. Next, when shutter speed dial 2 is rotated, coupling plate 15 as well as cylindrical shaft 9 is rotated by means of supporting plate 14, with interlock pin 4a sliding on lower surface 15b of coupling plate 15. At this time, the shutter speed dial can be freely rotated irrespective of its position since sustaining ring 10 is pushed downwardly by coil spring 12 and maintains engaging pin 6 below fixed plate 16. However, when coupling plate 15 is rotated until interlock pin 4a engages with notch 15a as in FIG. 5, interlock pin 4a pushes interlock detecting pin 5 upwardly. As a result, sustaining ring 10 is deformed against its elasticity and the ring portion thereof raises upwardly to likewise raise engaging pin 6 so that pin 6 abuts against the lower surface of fixed plate 16 (FIG. 5). After this operation, if the shutter speed dial is moved, for example, to the position where the AUTO mark thereof aligns with an index 17, engaging pin 6 enters notch 16a of fixed plate 16 so that the shutter speed dial 2 is locked, and at the same time engagement releasing rod 11 emerges out of the upper surface of the shutter speed dial as clearly shown in FIG. 6.

Should it be desired to change the shutter speed from AUTO to another desired value, engagement releasing rod 11 which has projected out of the upper surface of the shutter speed dial may be pushed downwardly. Then sustaining ring 10 rocks with its fulcrum being the portion where the interlock detecting pin is fixed, thus removing engaging pin 6 from notch 16a of fixed plate 16 to release the engagement of the shutter speed dial. Accordingly, shutter speed can be changed from AUTO to another desired value by rotating the shutter speed dial and pushing engagement releasing rod 11.

In the embodiment described above, the shutter speed dial is locked at an automatically controlled shutter speed position. Moreover, the dial can be provided with several locking positions if necessary, e.g., a shutter speed in which a picture is taken in synchronism with a flash, or a shutter speed in which shutter speed is mechanically controlled in a camera of which shutter speed is normally controlled electrically.

In accordance with the shutter speed setting device of the present invention, the shutter speed setting member can be freely operated irrespective of its position so as to search for the interlocking position until it is interlocked with the shutter speed setting mechanism of the camera body, and the locking device operates at a particular position only after the interlock is completed. Therefore, troubles such as the shutter speed setting being switched unpreparedly can be avoided.

Obviously many modifications and variations of the present invention are made possible in the light of the above teachings. It is therefore to be understood that within the scope of the appended claims the invention may be practiced otherwise than as specifically described.

What is claimed is:

1. An operating device on a camera attachment removably connected to a camera body, which camera body includes an exposure factor setting mechanism, the operating device comprising:
   an operating knob movable to at least one predetermined operative position at which said knob is to be locked, and to other positions thereof;
   means movable together with said operating knob for coupling said operating knob with said exposure factor setting mechanism;
   means for locking said operating knob at said predetermined position when in its operative position, said locking means being movable between an inoperative and an operative position;
   means for holding said locking means in its inoperative position;
   means for moving said locking means to its operative position against the influence of said holding means as said coupling means effects the coupling between said operating knob and said exposure factor setting mechanism.

2. An operating device as set forth in claim 1, wherein said camera attachment is a view finder unit.

3. An operating device as set forth in claim 1, further comprising means manually operable for releasing the locking of said operating knob so that said operating knob can be moved to said other positions from said predetermined position.

4. An operating device as set forth in claim 3, wherein said releasing means includes a member so arranged as to be rendered manually operable only when said operating knob is locked by said locking means.

5. An operating device as set forth in claim 1, further comprising means for connecting said operating knob with said coupling means for movement together therewith.

6. An operating device as set forth in claim 5, wherein said operating knob is rotatably mounted on said camera attachment, said connecting means including a rod extending downwardly from said operating knob, and said coupling means including a disk with which the lower end of said rod is coupled.

7. An operating device as set forth in claim 6, wherein said exposure factor setting mechanism includes a pin member projecting out of said camera body and being abuttable on the lower surface of said disk when said camera attachment is connected to said camera body, and said disk is of an elastic material so as to be elastically deformed by the abutment on said projecting member and includes means forming a notch in which said projecting member engages, the coupling between said operating knob and said exposure factor setting mechanism being accomplished when said projecting member has engaged in said notch.

8. An operating device as set forth in claim 7, wherein said moving means includes a first plate movably supported about said rod and a pin projecting downwardly from said first plate, and said holding means includes a spring biasing said plate downwardly, said first plate pin being held by said coupling means so as to rotate with the latter and positioned above said notch of said disk so as to be pushed upwardly with said first plate against the bias of said spring by said projecting member when said projecting member has engaged with said notch.

9. An operating device as set forth in claim 8, wherein said locking means includes a locking member projecting upwardly from said first plate and a second plate fixedly arranged about said rod and above said first plate and having at least one engaging portion, said locking member being movable upwardly to its operative position to abut on the lower surface of said second plate when said first plate is pushed upwardly with said first plate pin pushed by said projecting member of said exposure factor setting mechanism, said locking member being engagable with said engaging portion of said second plate to lock said operating knob when said operating knob is rotated to said predetermined position and said locking member is in its operative position, and said first plate being of an elastic material so as to be elastically deformed when said first plate pin is pushed upwardly by said projecting member and said locking member abuts on said lower surface of said second plate.

10. An operating device as set forth in claim 9, wherein said operating knob and said rod having an opening extending therethrough and further comprising a release rod disposed in said opening and connected with said first plate at its lower end, said release rod projecting out of said opening when said locking member engages with said engaging portion of said second plate, and said first plate being elastically deformed so that said locking member disengages from said engaging portion of said second plate when said release rod, which has projected out of said opening, is depressed.

* * * * *

UNITED STATES PATENT OFFICE
CERTIFICATE OF CORRECTION

PATENT NO. : 4,021,829
DATED : May 3, 1977
INVENTOR(S) : Minoru Sekida

It is certified that error appears in the above-identified patent and that said Letters Patent are hereby corrected as shown below:

[30] Foreign Application Priority Data

Dec. 23, 1974 Japan ..........................50-2530

Signed and Sealed this

Twenty-seventh Day of September 1977

[SEAL]

Attest:

RUTH C. MASON
Attesting Officer

LUTRELLE F. PARKER
Acting Commissioner of Patents and Trademarks